Figure 1:
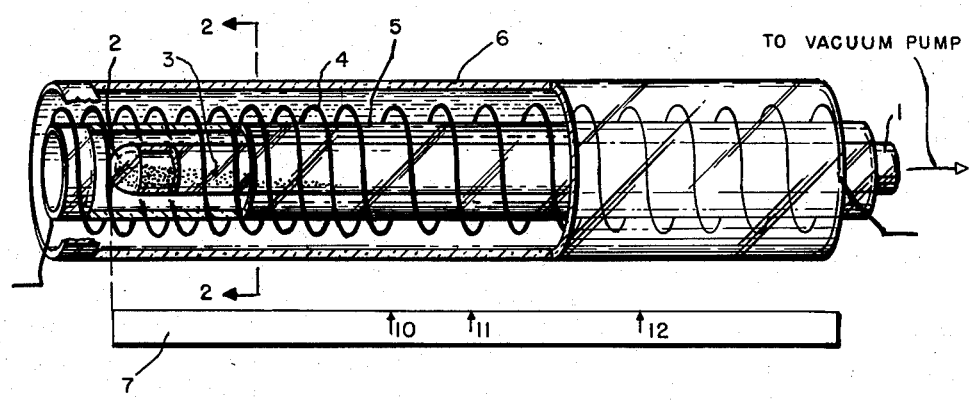

July 12, 1960 G. A. WOLFF 2,944,885
METHOD OF PURIFYING ARSENIC AND ANTIMONY
Filed June 2, 1959

TO VACUUM PUMP

INVENTOR,
GUENTER A. WOLFF
BY
Harry M. Saragovitz
ATTORNEY

2,944,885

METHOD OF PURIFYING ARSENIC AND ANTIMONY

Guenter A. Wolff, Little Silver, N.J., assignor to the United States of America as represented by the Secretary of the Army Filed June 2, 1959, Ser. No. 817,694

4 Claims. (Cl. 75—69)

(Granted under Title 35, U.S. Code (1952), sec. 266)

The invention described herein may be manufactured and used by or for the Government for governmental purposes without the payment of any royalty thereon.

This invention relates to a method of purification of arsenic and antimony.

There has been little if any success in preparing intermetallic compounds of high purity which contain arsenic or antimony as major constitutents. Such intermetallic compounds are, for instance, indium arsenide, gallium arsenide, indium antimonide, gallium antimonide, etc. Such intermetallic compounds if used for solar batteries, transmitters and rectifiers, infra-red detectors, photomagnetic devices, etc. must be of very high purity if they are to function effectively at higher temperatures. Lack of success in using these compounds is attributed to the difficulties encountered in removing sulphur, selenium and tellurium as impurities from the arsenic or the antimony before reacting it with indium and gallium. Methods of purifying indium and gallium are well known and no particular difficulties are encountered in producing indium and gallium of high purity. Arsenic and antimony, however, which are usually purified by sublimation of the elements cannot be obtained in sufficiently pure form. The efficacy of the known methods of removing impurities such as the elements of the sulphur group (sulphur, selenium and tellurium) from arsenic and antimony is rather low because the volatile sulphur compounds ($As_2S_2$ and $As_2S_3$) and those of antimony ($Sb_2S_2$ and $Sb_2S_3$) have about the same volatility as arsenic and antimony respectively; the same is generally true for the corresponding compounds of selenium and tellurium.

I now have found that metallic arsenic and metallic antimony of any desired degree of purity may be obtained by heating the impure oxides of these metals in the closed end of a tube made of Pyrex glass or quartz to at least the sublimation temperature of the respective oxide whereupon the metal oxide vapor is allowed to fractionally condense along a prolonged path of decreasing temperatures within the evacuated tube to form zones of metal oxide crystals of different degrees of purity. Under these conditions the gaseous metal oxide will deposit within the tube at different distances. There will be a first short zone of rather dark colored crystals of the arsenic or antimony oxide containing all sorts of impurities other than those from the sulphur group. This first zone is followed by a central zone of considerable length of pure crystals of pure white appearance after which comes a third zone of reddish-orange to almost black color containing sulfides, selenides and tellurides of arsenic or antimony. This third zone can be readily distinguished from the central zone by its discoloration.

The extent of the central zone of white oxide crystals is now marked on a scale external to the tube, the part of the tube containing the central zone is cut off and the pure crystals contained in this central zone are removed, filled into the closed end of a second tube of the same dimensions as the first tube and again submitted to a fractional sublimation under conditions identical with the first fractional sublimation. In this second fractional sublimation the discoloration caused by impurities is usually insufficient to be clearly noticed. However, the central zone can now be determined with the aid of the marks made on the external scale and this zone is now separated by cutting from the rest of the tube. This fractional sublimation may be repeated several times until the desired degree of purity of the metal oxide is attained whereupon the pure metal oxide is reduced to the metallic state.

Figure 2:
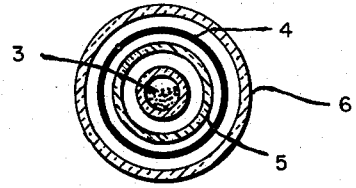

The invention will become more apparent from the following description of specific embodiments of the broad inventive idea as carried out in the apparatus described in the accompanying drawing, in which:

Fig. 1 shows a perspective view, partially broken away, of the apparatus for the fractional sublimation of arsenic or antimony oxides, and Fig. 2 shows a cross-section taken along the line 2—2 of Fig. 1.

The apparatus shown in Fig. 1 consists of a quartz tube 1 the closed end 2 of which is partially filled with oxides 3 of either arsenic or antimony. An electrical heating coil 4 is wound between the quartz tubes 5 and 6 in such a manner that the part surrounding the closed end of tube 1 can be heated to a higher temperature than the remaining part of tube 1. The open end of tube 1 is connected to a high vacuum pump.

In order to produce metallic arsenic of extremely high purity I proceed, for instance, as follows:

100 g. of arsenic trioxide ($As_2O_3$) of commercial grade having a grayish white appearance is finely powdered and filled into the closed end 2 of a quartz tube of 1" diameter and of 20" length. The tube end containing the arsenic trioxide is now heated to 220° C. while the region beyond this zone is held to a temperature of about 120° C. The arsenic trioxide evaporates and then condenses along the rest of the tube. During this first fractional sublimation the zones of different impurities show up clearly by discolorations. Usually there is first a zone of about 1 to 2" (marked by arrows 10 and 11 on the index bar 7) showing dark crystals, the discoloration being caused by impurities other than those of the sulphur group. Then follows a major zone of about 5 to 6" (marked by arrows 11 and 12) consisting of large, white crystals or crystallites of arsenic trioxide. This zone is then followed by a reddish-orange to black zone containing the impurities of the sulphur group. After practically most of the arsenic trioxide has evaporated from the end 2 of the tube 1 the extent of the central fraction 11 to 12 is marked on the index bar 7 and this central part is then cut off, the white crystals are removed from the tube and the purification process repeated in a second tube of identical dimensions under identical conditions. Usually five careful fractional sublimations yield an arsenic oxide of extremely high purity corresponding to a purification factor of better than $10^{-6}$. As the purification of the arsenic oxide increases with the number of cycles or runs, the identification of the pure central fraction as distinguished from the other fractions which are to be discharged is no longer possible by color indication. However, if according to the invention the runs are made under identical conditions all the fractions will appear in the same locations and the marks 11 to 12 on the index bar 7 may be used to identify the central zone of highest purity which is to be utilized for repeated purifications.

After the purification is complete, the oxide is reduced to arsenic by hydrogen at elevated temperature. The hydrogen can be purified by diffusing it thru a heated palladium tube, or by passing it over heated copper turnings or silver wool. A subsequent fractional sublimation of the arsenic is advisable.

The above-described method will purify arsenic compounds contaminated with sulphur, selenium or tellurium or a mixture of these elements.

The fractional sublimation of antimony oxides may be carried out in about the same manner but in this case it will be necessary to raise the sublimation temperature to just below 570° C. while keeping the rest of the tube at temperatures which are about 20° to 100° C. lower than the sublimation temperature.

It will be obvious to those skilled in the art that many different changes may be resorted to in the process of the present invention without departing from the broad inventive idea defined in the following claims.

What is claimed is:

1. A fractional sublimation process for removing the elements of the sulphur selenium and tellurium from a metal of the group consisting of arsenic and antimony comprising heating the oxides of said metals in the closed end of a tube under high vacuum to at least their sublimation temperatures, allowing the metal oxide vapors to fractionally condense along a prolonged path of decreasing temperatures within the evacuated tube to form zones of metal oxide crystals of different degrees of purity, said zones being identifiable by different degrees of discoloration, marking the extent of the central white zone of purest oxide crystals on an index bar external to the tube, separating said white central oxide zone within the tube from the discolored zone by a mechanical cutting operation, repeating this fractional sublimation with the oxide taken from the central zone in a second tube under conditions identical with the first fractional sublimation, again separating the pure central zone by cutting the second tube according to the marks made on the index bar during the first fractional sublimation, repeating this cycle several times until a purification factor of better than $10^{-6}$ is attained, whereupon the pure metal oxide is reduced to the metallic state.

2. A method of purifying arsenic according to claim 1 in which arsenic trioxide is heated to a sublimation temperature of about 220° C. while the rest of the evacuated tube is held at about 120° C.

3. A method of purifying antimony according to claim 1 in which an antimony oxide is heated to a sublimation temperature of just below 570° C. while the rest of the evacuated tube is held at temperatures which are about 20 to 100° C. lower than the sublimation temperatures of the antimony compound.

4. A method of purifying a member of the group consisting of arsenic and antimony according to claim 1 in which the purified oxide is reduced to the metallic state by highly purified hydrogen at elevated temperatures whereupon the purified metal is subjected to a fractional sublimation.

References Cited in the file of this patent

UNITED STATES PATENTS

| | | |
|---|---|---|
| 711,188 | Stone | Oct. 14, 1902 |
| 1,475,294 | Germot | Nov. 27, 1923 |
| 2,251,906 | Hanawalt | Aug. 12, 1941 |

OTHER REFERENCES

Distillation Index and Abstracts, 1953–1954, by Arthur and Elizabeth Rose, page 235. (Copy in Scientific Library.)